US012607586B2

(12) United States Patent
Ming et al.

(10) Patent No.: US 12,607,586 B2
(45) Date of Patent: Apr. 21, 2026

(54) INFRARED THERMAL IMAGING DEFECT DETECTION METHOD AND APPARATUS FOR SUBSTATION INSULATOR

(71) Applicant: CHONGQING UNIVERSITY, Chongqing (CN)

(72) Inventors: Ruotong Ming, Chongqing (CN); Fan Yang, Chongqing (CN); Pengbo Wang, Chongqing (CN); Tian Tan, Chongqing (CN); Hongrui Yi, Chongqing (CN); Zhili Li, Chongqing (CN); Zikang Yang, Chongqing (CN); Hui Jiang, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 371 days.

(21) Appl. No.: 18/274,448

(22) PCT Filed: Sep. 30, 2022

(86) PCT No.: PCT/CN2022/123250
§ 371 (c)(1),
(2) Date: Jul. 26, 2023

(87) PCT Pub. No.: WO2024/027009
PCT Pub. Date: Feb. 8, 2024

(65) Prior Publication Data
US 2025/0012746 A1　Jan. 9, 2025

(30) Foreign Application Priority Data
Aug. 3, 2022　(CN) .......................... 202210926177.9

(51) Int. Cl.
*G01N 25/72* (2006.01)
*G01J 5/48* (2022.01)
(Continued)

(52) U.S. Cl.
CPC .............. *G01N 25/72* (2013.01); *G01J 5/485* (2022.01); *G06V 10/82* (2022.01); *G01J 2005/0077* (2013.01); *G06V 10/26* (2022.01)

(58) Field of Classification Search
CPC .. G01N 25/72; G01J 5/485; G01J 2005/0077; G01J 5/0096; G06V 10/82; G06V 10/26;
(Continued)

(56) References Cited

U.S. PATENT DOCUMENTS

2016/0148140 A1*　5/2016　Wu ................... G06Q 10/06315
705/7.25

FOREIGN PATENT DOCUMENTS

CN　　111679142 A　*　9/2020　............. G01R 31/00
CN　　114155212 A　*　3/2022　............. G06N 3/045

* cited by examiner

*Primary Examiner* — Charlotte M Baker
(74) *Attorney, Agent, or Firm* — Bochner PLLC; Andrew D. Bochner

(57) ABSTRACT

The present disclosure discloses an infrared thermal imaging defect detection method and apparatus for a substation insulator. An infrared module is bidirectionally connected to a core computing module, and an infrared module is unidirectionally connected to a high-rate battery. The core computing module is unidirectionally connected to a touch screen. The infrared module is configured to obtain infrared radiation information through a lens, and calculate and generate a temperature distribution video. The method includes infrared video acquisition, thermal region segmentation, device type determination, key temperature information extraction, defect diagnoses, result display and result saving.

9 Claims, 5 Drawing Sheets

(51) Int. Cl.
    *G06V 10/82*         (2022.01)
    *G01J 5/00*          (2022.01)
    *G06V 10/26*        (2022.01)

(58) Field of Classification Search
    CPC .............. G06V 10/764; G01R 31/1218; G01R
                                             31/1245
    USPC ....................................................... 382/190
    See application file for complete search history.

640×480×3         640×480×1        Detection result

[228,101, 189,241, 460,156]

[104,111, 69,168, 250,47]

[43,90, 110,47, 40,159]

INFRARED THERMAL IMAGING DEFECT DETECTION METHOD AND APPARATUS FOR SUBSTATION INSULATOR

CROSS REFERENCE TO RELATED APPLICATION

This application is a national stage application of International Patent Application No. PCT/CN2022/123250, filed on Sep. 30, 2022, which claims priority to Chinese Patent Application No. 202210926177.9, filed with the China National Intellectual Property Administration on Aug. 3, 2022 and entitled "INFRARED THERMAL IMAGING DEFECT DETECTION METHOD AND APPARATUS FOR SUBSTATION INSULATOR", which is incorporated herein by reference in its entirety.

TECHNICAL FIELD

The present disclosure belongs to the field of insulator detection technologies, and particularly relates to an infrared thermal imaging defect detection method and apparatus for a substation insulator.

BACKGROUND

In the power system, the insulator not only serves to insulate live equipment from the ground, but also has a function of supporting and fixing primary substation equipment. Dielectric strength of live equipment to the ground will be seriously affected by the deterioration of the insulator, resulting in a decrease in an insulation resistance, and the live equipment discharges, which results in a short-circuit accident, so that a power grid cannot operate safely and stably. Because of a large quantity of insulators in a substation, it is a key problem how to detect and distinguish the insulators efficiently, accurately and quickly in daily operation and maintenance.

An infrared diagnosis is a common method of equipment electrification diagnosis in a substation. The principle of infrared diagnosis is that when a device in an abnormal state works with electricity, it is often accompanied by a change of a thermal effect, and problems such as poor contact, insulation deterioration, and abnormal eddy currents can be determined by infrared temperature measurement. Currently, the infrared diagnosis method is mainly that operation and maintenance staff use a hand-held infrared thermal imager to photograph a thermal image of each device, and perform defect judgment and classification backup on an image after data acquisition. The existing method has highly repetitive work content, requires a large amount of man-power, has a high requirement on professional and work experience of an inspector for a defect type with a small temperature difference in heating, has subjectivity in a diagnosis result, and is poor in real-time diagnosis and analysis.

SUMMARY

The present disclosure provides an infrared thermal imaging defect detection method and apparatus for a substation insulator to solve the technical problems in the conventional technology, such as having highly repetitive work content, requiring a large amount of manpower, having a high requirement on professional and work experience of an inspector for a defect type with a small temperature difference in heating, having subjectivity in a diagnosis result, and being poor in real-time diagnosis and analysis. These problems exist in the method in which operation and maintenance staff use a hand-held infrared thermal imager to photograph a thermal image of each device, and perform defect judgment and classification backup on an image after data acquisition.

The present disclosure uses the following technical solutions:

An infrared thermal imaging defect detection apparatus for a substation insulator, including an infrared module and a core computing module. The infrared module is bidirectionally connected to the core computing module, and an infrared module is unidirectionally connected to a high-rate battery. The core computing module is unidirectionally connected to a touch screen; and the infrared module is configured to obtain infrared radiation information through a lens, and calculate and generate a temperature distribution video.

The core computing module is configured to control operation and computation of the infrared module so as to adjust a temperature computing parameter. The core computing module is further configured to implement identification of an infrared image of the substation insulator, core computing of key temperature information in an insulator area, and infrared thermal imaging and fault detection for the substation insulator.

An improved Yolov5 algorithm model is used in infrared image identification of the substation insulator, and a computing process is performed by using a graphics processing unit (GPU) of the core computing module. A defect diagnosis is implemented based on an adaptive feature temperature extraction algorithm, and is jointly implemented by using a central processing unit (CPU) and the GPU of the core computing module. A specific defect diagnosis process is that a compiled linux executable file is run in the core computing module, the file is loaded with a trained improved Yolov5 algorithm weight file, the GPU performs a convolution operation on a photographed video stream or picture, finally inputs a video stream or picture obtained after the convolution operation into a classifier and preselected boxes Anchor boxes identify the substation insulator, and after the substation insulator is detected, the substation insulator defect is diagnosed based on the adaptive feature temperature extraction algorithm and a defect level judgment criterion. A touch display screen displays infrared thermal images, identified substation insulators, and defect levels in real time.

The infrared module uses an uncooled focal plane infrared module, an infrared temperature image has a resolution of 640-480 or more, and the infrared module is connected to the core computing module by using Ethernet, and communicates with the core computing module by using a real time streaming protocol (RTSP); the core computing module employs Jetson Xavier NX from Nvidia; and the touch screen is connected to the core computing module by using a High-Definition Multimedia Interface (HDMI) transport protocol interface and a Universal Serial Bus (USB) transport protocol interface, which are configured to transmit an image signal and a control signal, respectively.

Diagnostic development of the core computing module is based on Ubuntu ARM64. Infrared image processing and identification tasks are completed in a GPU of the core computing module, a parallel computing architecture adopts CUDA10.2+cuDnn8.0, and based on the computing architecture a Yolov5 convolutional neural network model is optimized. Specifically, first, original red, green, blue (RGB) three channels of a photographed and extracted video stream or picture are converted into a grayscale image single channel, and then, K-means clustering is performed on the preselected boxes Anchor boxes based on an acquired substation insulator data set. A data stream analysis tool Deep-Stream 5.0 is used to accelerate a process of implementing real-time device identification for implementing real-time video data processing.

A detection method of the apparatus includes the following steps.

S1. Infrared video acquisition: Start the apparatus by using a switch button, an infrared module automatically processes and generates an infrared thermal image, and an operator sets an ambient temperature parameter by using a touch display screen, and aligns a lens of the apparatus to a target device;

S2. Thermal region segmentation: Perform sliding window analysis on the thermal image obtained by an infrared module, and segment it to obtain a square thermal region;

S3. Device type determination: Input an image of the square thermal region into a convolutional neural network model for device identification, the model returns an identified substation insulator, and if no identifiable device type is detected. "no device" is returned;

S4. Key temperature information extraction: Calculate a maximum temperature value $T_1$ and coordinates thereof, a median temperature value $T_2$ and an average temperature $T_0$ in the square thermal region, and calculate a temperature difference $\Delta T = T_1 - T_2$, and a relative temperature difference $\delta = (T_1 - T_2)/(T_1 - T_0)$;

S5. Defect diagnoses: With reference to the identified device type, the temperature difference $\Delta T$ and the relative temperature difference $\delta$, query a diagnosis criterion table to determine whether the diagnosis criterion table is in an abnormal interval and a corresponding defect property;

S6. Result display: A display screen displays a photographed infrared thermal image in real time, displays the identified device type in a form of text, if a diagnosis result is that a defect exists, displays a defect level in a form of text, and marks a location area in which a hot spot is located in a form of a box; and S7. Result saving: Save a picture corresponding to the current frame, and generate JSON file for recording a picture number, a substation insulator, a temperature difference, a relative temperature difference, a hot spot location, and defect type information.

The method of segmenting to obtain a square thermal region includes: (1) setting a square window size, where a side length value is the same as an infrared video height value: (2) calculating an average temperature under a square window; (3) sliding the window for several times, segmenting an image by selecting a window with a maximum average temperature, and recording a step size and a quantity of slipping times corresponding to the thermal region.

Identification of the substation insulator is based on an improved Yolov5 model of a deep convolutional neural network model Yolov5, an input object is a square thermal region obtained through segmentation, and an output object is the substation insulator and a voltage level of the substation insulator.

Key temperature information includes a maximum temperature value and coordinates thereof, a median temperature value, and an average temperature in the square thermal region after segmentation.

The method for determining a type of a substation insulator and displaying a result specifically includes:

(1) considering a maximum temperature as a suspected heating point temperature, considering a median temperature value as a normal temperature value, considering an average temperature as an ambient temperature, calculating a temperature difference and a relative temperature difference, calculating a maximum temperature value $T_1$ and coordinates thereof, a median temperature value $T_2$, and an average temperature $T_0$ in the square thermal region, and calculating a temperature difference $\Delta T = T_1 - T_2$, and a relative temperature difference $\delta = (T_1 - T_2)/(T_1 - T_0)$;

(2) automatically querying whether the temperature difference and the relative temperature difference are in a defect range based on an identified type of power equipment;

(3) if a hot spot conforms to a defect criterion, calculating coordinates of the hot spot in a thermal image before segmentation based on a quantity of sliding times of the thermal region and a step size;

(4) displaying an original thermal image data stream, displaying the identified device type in real time, and marking the hot spot location with a box if a defect exists.

The present disclosure has the following beneficial effects:

The apparatus in the present disclosure is light and convenient, and working efficiency of data processing and computing can be greatly improved by using an infrared module imaging terminal of an improved Yolov5. System service capability is strong. Embedded fault detection based on a semantic segmentation algorithm can make identification more refined and greatly reduce a later manual computation workload. The system is convenient to use. The device has a real-time defect diagnosis function of a substation insulator device, and a user can quickly determine a defect level only by confirming an automatic diagnosis result.

The present disclosure solves the technical problems in the conventional technology, such as having highly repetitive work content, requiring a large amount of manpower, having a high requirement on professional and work experience of an inspector for a defect type with a small temperature difference in heating, having subjectivity in a diagnosis result, and being poor in real-time diagnosis and analysis. These problems exist in the method in which operation and maintenance staff use a hand-held infrared thermal imager to photograph a thermal image of each device, and perform defect judgment and classification backup on an image after data acquisition.

DETAILED DESCRIPTION OF THE EMBODIMENTS

Figure 1:
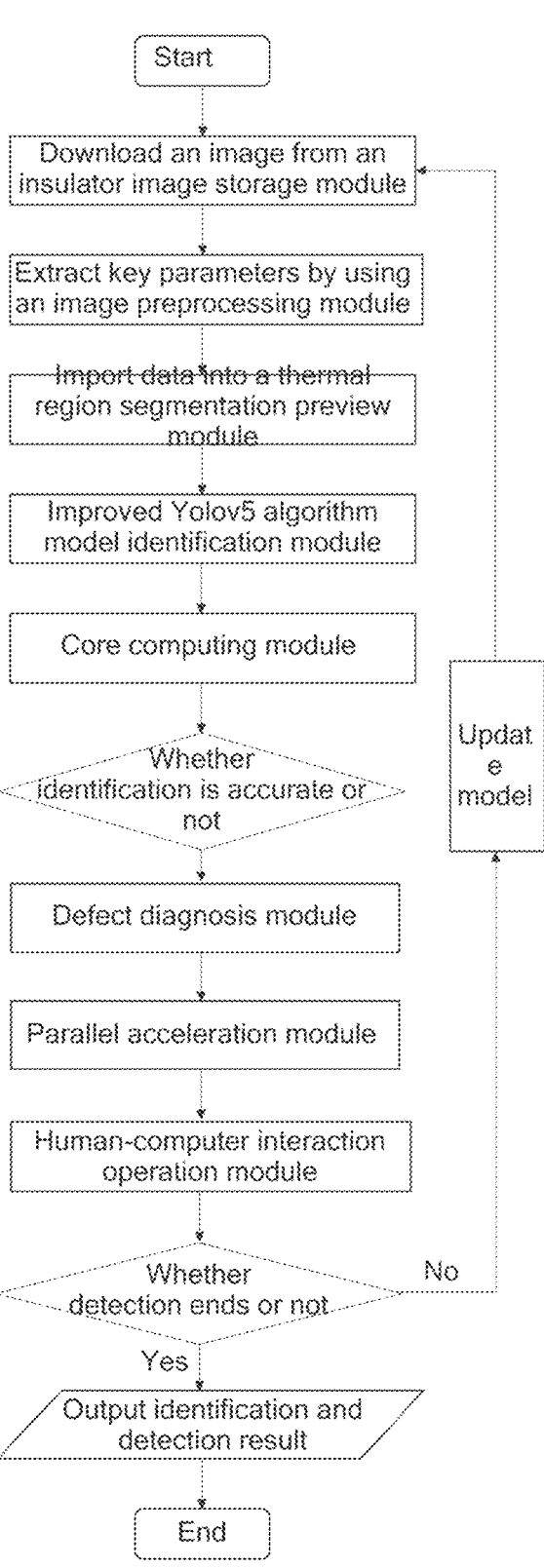
FIG. 1 is a flow chart of image identification of an infrared thermal imaging detection system of a substation insulator.

An infrared thermal imaging defect detection apparatus for a substation insulator includes an infrared module, a touch screen, a core computing module, a USB flash drive or Micro SD card, a power supply control, a high-rate battery, a button and another peripheral circuit. The infrared module is bidirectionally connected to the core computing module, the infrared module (that is, the infrared module) is further unidirectionally connected to the high-rate battery, the core computing module is separately connected to a 5V power supply control, the USB flash drive or Micro SD card, the touch screen, the button, and another peripheral circuit, and the core computing module is unidirectionally connected to the touch screen. The infrared module is configured to obtain infrared radiation information through a lens, and calculate and generate a temperature distribution video.

The core computing module is a control system of the apparatus, which is configured to control operation and computation of the infrared module so as to adjust a temperature computing parameter. The module has an identification function of the substation insulator, a core computing function of detecting key temperature information in an insulator area, and a function for the substation insulator performing infrared thermal imaging and fault detection. An improved Yolov5 algorithm model is used in infrared image identification of the substation insulator, which has a great advantage in the rapid deployment of the model. A computing process is completed by using a GPU of the core computing module.

TABLE 1

| An overview of apparatus performance indices | |
| --- | --- |
| Specification | Parameter |
| Infrared resolution | 640 × 480 |
| Identifiable device | Insulator |
| Abnormal identification | Accuracy 90% |
| Detection rate | 29 frames/sec |
| Temperature measurement range | −20 to 150° C. |
| Temperature measurement accuracy | ±2° C. |
| Typical power consumption | 15 W@25° C. |
| Size | 240 × 200 × 135 mm |
| Duration | 5.5 h |

A defect diagnosis is implemented based on an adaptive feature temperature extraction algorithm, and is jointly implemented by using a CPU and the GPU of the core computing module; and a specific defect diagnosis process is that a compiled linux executable file is run in the core computing module, the file is loaded with a trained improved Yolov5 algorithm weight file, and the GPU enhances a photographed video stream or picture (480*640) through Mosaic data at an input terminal and adapts an image matrix to anchor box computation and picture scaling. An image is then sliced through a Focus structure in a backbone section and input to a subsequent CSP structure. A Neck part uses an FPN+PAN structure and uses a CSP2 structure designed by the CSPnet for reference to enhance a capability of feature fusion. Finally, extracted features are input into a classifier and the substation insulator is identified by preselected boxes Anchor boxes. After the substation insulator is detected, a substation insulator defect is diagnosed based on the adaptive feature temperature extraction algorithm and a defect level judgment criterion. A touch display screen displays infrared thermal images, identified substation insulators, and defect levels in real time, and the touch screen can be further used for human-computer interaction. The apparatus can be inserted into a Micro SD card or a USB flash drive to save image or video data, and hot plugging can be implemented when video recording is not turned on. The apparatus is powered by a high-power battery, where the infrared module is directly powered by a high-power group, and the core computing module and a display screen are powered by a 5V power supply control.

The infrared module uses an uncooled focal plane infrared module, an infrared temperature image has a resolution of 640×480 or more, and the infrared module is connected to the core computing module by using Ethernet, and communicates with the core computing module by using a real time streaming protocol (RTSP); the core computing module employs Jetson Xavier NX from Nvidia; and the touch screen is connected to the core computing module by using a High-Definition Multimedia Interface (HDMI) transport protocol interface and a Universal Serial Bus (USB) transport protocol interface, which are configured to transmit an image signal and a control signal, respectively. The high-rate battery supplies power to the infrared module, and a power supply chip is used to obtain a voltage of 5 V to supply power to the core module and the touch display screen. The power supply chip supplies a power supply voltage of 18 V to the Jetson Xavier NX, and power supply voltages required for the infrared module and the touch screen of the apparatus are 12 V and 5 V, respectively. Therefore, an input voltage is reduced by using TPS54540 and LM2596 chips, separately, to obtain a required voltage. A 5200 mah 25 C airplane-mode lithium battery is used as a power supply for a circuit in a power supply section of the circuit, and an IMAX B6AC 80 w airplane-mode balanced charger is configured to charge the power supply.

Figure 3:
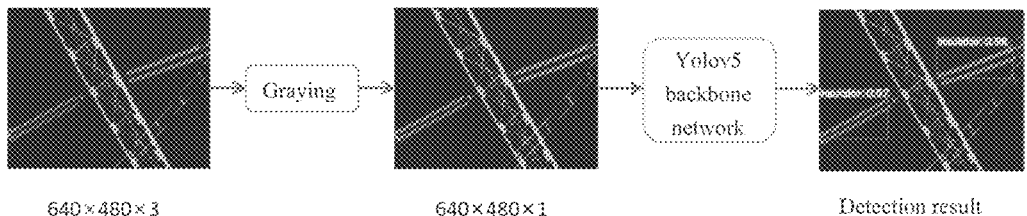
FIG. 3 is a schematic diagram of an RGB three-channel changing into a grayscale image single-channel.
Figure 4A:
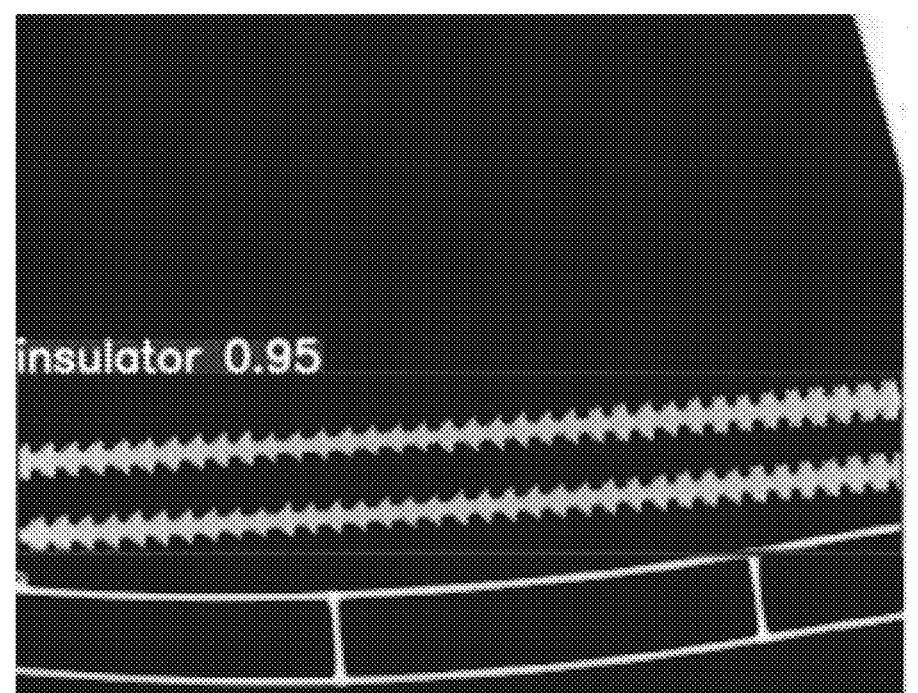
FIGS. 4A-C are schematic diagrams of Anchor boxes clustering.
Figure 4B:
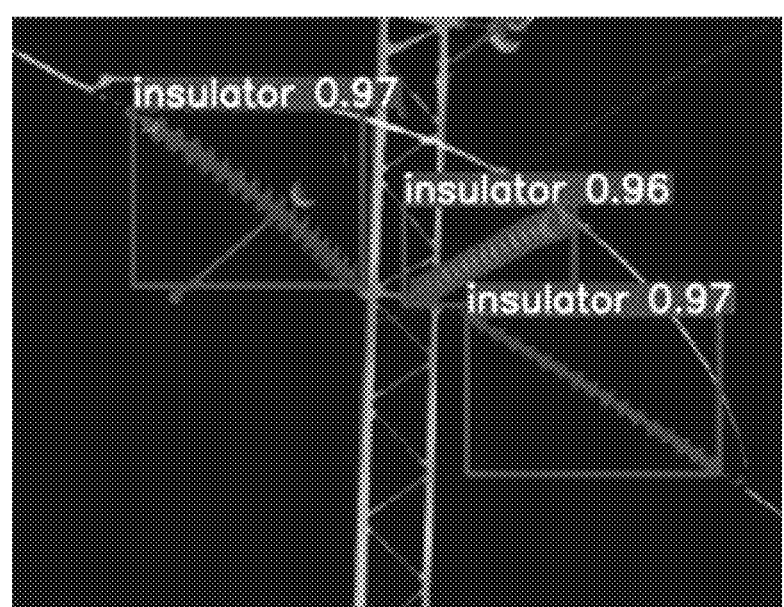
Figure 4C:
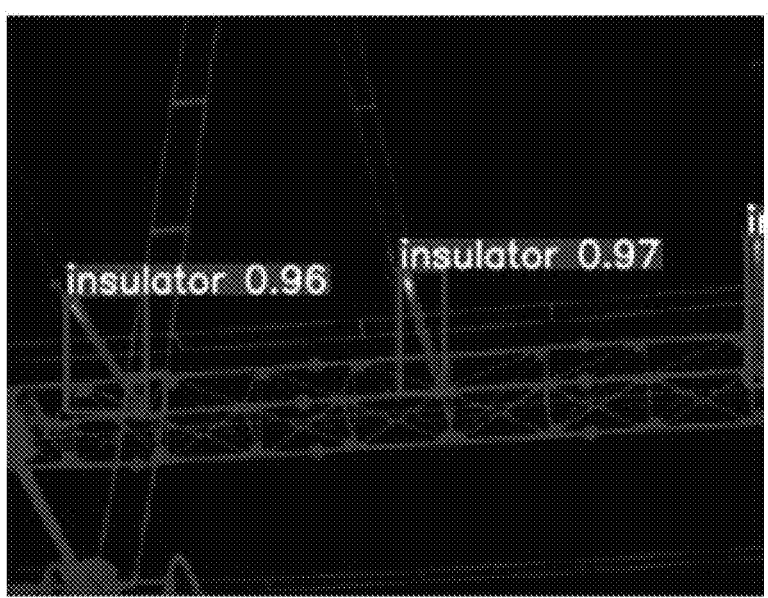
Figure 5:
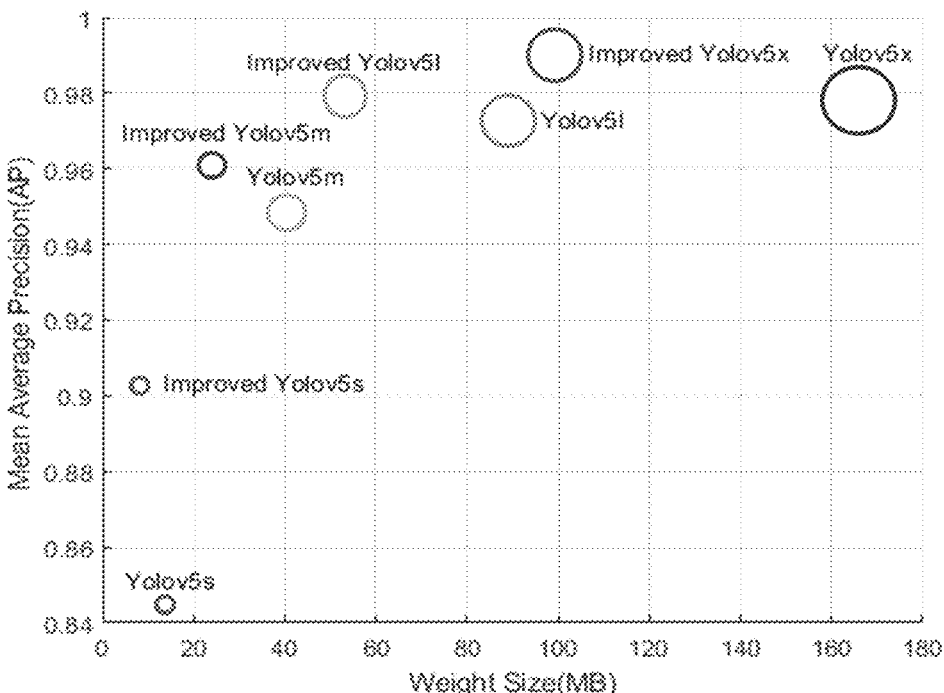
FIG. 5 is a schematic diagram of detection accuracy of an improved Yolov5 convolutional neural network.

Further, diagnostic software development of the core computing module is based on Ubuntu ARM64. Infrared image processing and identification tasks are completed in the GPU of the core computing module, a parallel computing architecture uses the CUDA10.2+cuDnn8.0, and based on the computing architecture a Yolov5 convolutional neural network model is optimized. A grayscale value of a grayscale channel and a temperature value corresponding to a pixel of an actually photographed infrared image are linearly correlated, and all the information to be calculated in the image can be fully expressed. Therefore, as shown in FIG. 3, original RGB three channels of a photographed and extracted video stream or picture are first converted into a grayscale image single channel, and a corresponding neural network input is changed into ⅓ of the original one, so that ⅔ of the computation of a Yolov5 convolutional neural network is saved, and finally the size of a trained weight file is reduced by ⅖, which is lighter and more favorable for mounting on an embedded device. Next, as shown in FIGS. 4A-C, K-means clustering is performed on preselected boxes Anchor boxes based on an acquired substation insulator data set, and finally the clustering is divided into three categories: large-sized, medium-sized, and small-sized. The three categories of large-sized, medium-sized, and small-sized have 9 Anchor boxes in total, which are more suitable for detecting insulators in different scenarios and distances, and improve a detection accuracy of the Yolov5 convolutional neural network. For a schematic diagram of the detection accuracy of an improved Yolov5 convolutional neural network, refer to FIG. 5. A data stream analysis tool DeepStream 5.0 is used to accelerate a process of implementing real-time device identification for implementing real-time video data processing.

Further, the button and another peripheral circuit include a switch button, a shooting button and another functional button or switch, where the switch button is connected to a switch interface of the core computing module, and the shooting button and another functional button or switch each are connected to universal input and output terminals of the core computing module.

Further, segmenting an image thermal region specifically includes the following steps: (1) Set a square window size, where a side length value thereof is the same as an infrared video height value: (2) Calculate an average temperature under a square window; (3) Slide the window for several times, segment an image by selecting a window with a maximum average temperature, and record a step size and a quantity of slipping times corresponding to the thermal region.

Further, identification of the substation insulator is based on an improved Yolov5 model of a deep convolutional neural network model Yolov5, an input object is a square thermal region obtained through segmentation, and an output object is the substation insulator and a voltage level of the substation insulator.

Further, the extracted key temperature information includes a maximum temperature value and coordinates thereof, a median temperature value, and an average temperature in the square thermal region after segmentation.

Further, real-time determination and result display of an abnormal state of the substation insulator specifically include: (1) considering a maximum temperature as a suspected heating point temperature, considering a median temperature value as a normal temperature value, considering an average temperature as an ambient temperature, calculating a temperature difference and a relative temperature difference based on a formula in the professional standard DL/T 664, calculating a maximum temperature value $T_1$ and coordinates thereof, a median temperature value $T_2$, and an average temperature $T_0$ in the square thermal region, and calculating a temperature difference $\Delta T = T_1 - T_2$, and a relative temperature difference $\delta = (T_1 - T_2)/(T_1 - T_0)$; (2) automatically querying whether the temperature difference and the relative temperature difference are in a defect range based on an identified type of power equipment, where a defect definition method is implemented in accordance with the professional standard DL/T 664; (3) if a hot spot conforms to a defect criterion, calculating coordinates of the hot spot in a thermal image before segmentation based on a quantity of sliding times of the thermal region and a step size; (4) displaying an original thermal image data stream, displaying the identified device type in real time, and marking a hot spot location with a box if a defect exists.

A diagnostic method based on the apparatus includes the following steps.

S1. Infrared video acquisition: An operator first enables a diagnostic apparatus by using a switch button, after the apparatus is enabled, an infrared module automatically processes and generates an infrared thermal image, and an operator sets parameters, such as an ambient temperature by using a touch display screen (that is, a touch screen), and aligns a lens of the apparatus to a target device.

S2. Thermal region segmentation: The apparatus performs sliding window analysis on the thermal image obtained by the infrared module, and segment it to obtain a square thermal region.

S3. Device type determination: Input an image of the square thermal region into a convolutional neural network model for device identification, the model returns an identified substation insulator, and if no identifiable device type is detected, "no device" is returned.

S4. Key temperature information extraction: Calculate a maximum temperature value $T_1$ and coordinates thereof, a median temperature value $T_2$ and an average temperature $T_0$ in the square thermal region, and calculate a temperature difference $\Delta T = T_1 - T_2$, and a relative temperature difference $\delta = (T_1 - T_2)/(T_1 - T_0)$.

S5. Defect diagnoses: With reference to the identified device type, the temperature difference $\Delta T$ and the relative temperature difference $\delta$, query a diagnosis criterion table to determine whether the diagnosis criterion table is in an abnormal interval and a corresponding defect property thereof. The diagnostic criteria table is performed with reference to appendix H and appendix I of the standard DL/T 664-2016 *Infrared Diagnostic Application Specification for Live Equipment.*

S6. Result display: A display screen displays an infrared thermal image photographed by a lens in real time, and displays the identified device type in a form of text, if a diagnosis result is that a defect exists, a defect level is displayed in a form of text, and a location area in which a hot spot is located is marked in a form of a box. The operator can set whether to display the maximum temperature $T_1$, the temperature difference $\Delta T$, and the relative temperature difference S in real time.

S7. Result saving: The operator presses a shooting button for a short time, which can save a picture corresponding to the current frame, and generate JSON file for recording a picture number, a substation insulator, a temperature difference, a relative temperature difference, a hot spot location, and defect type information. The operator can record an infrared video by long pressing the shooting button, and touching a screen during recording can generate JSON file for recording a video number, a time point, a device type, a temperature difference, a relative temperature difference, a hot spot location, and defect type information. The saving function is available only when a Micro SD card or a USB flash drive is inserted.

Figure 2:
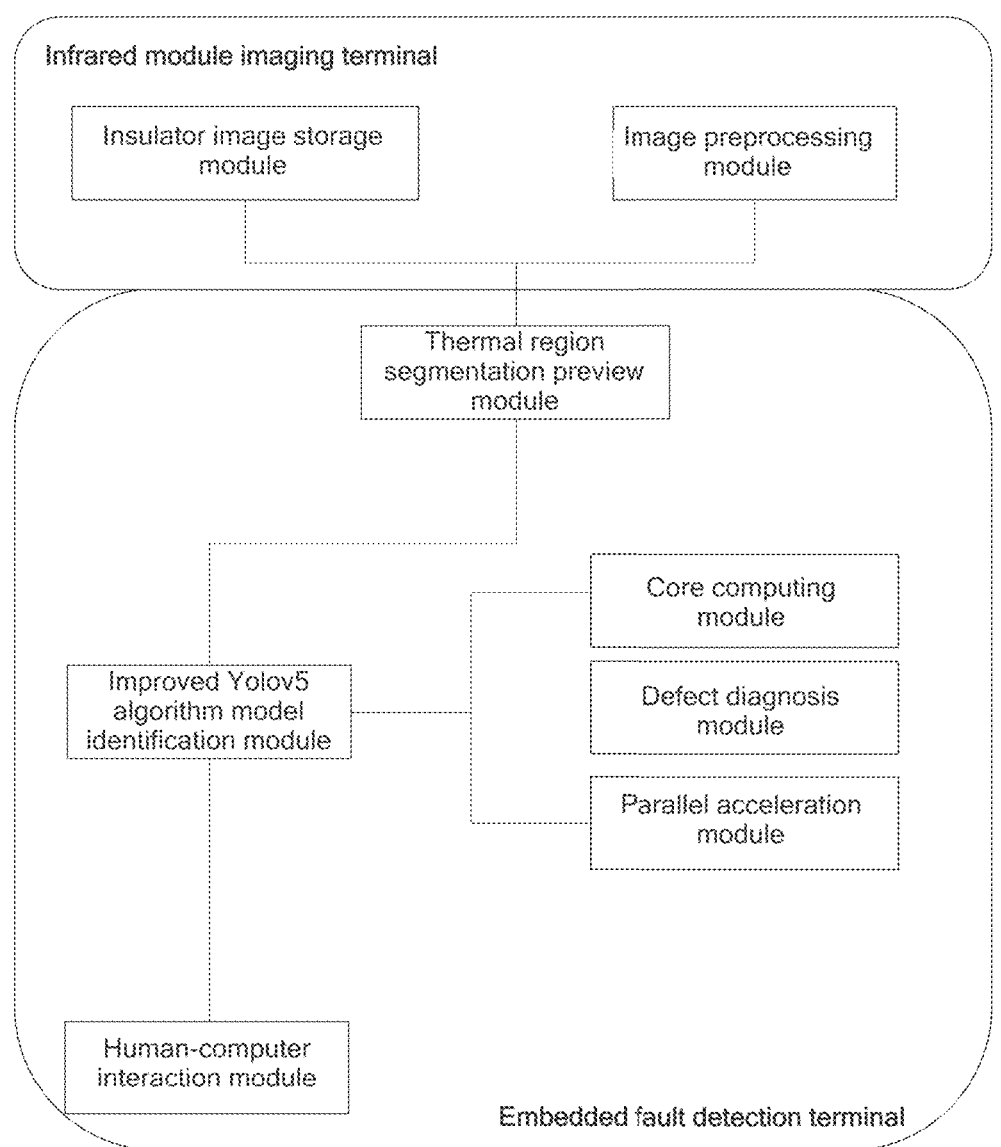
FIG. 2 is a flow chart of a defect diagnosis of an infrared thermal imaging detection system of a substation insulator.

As shown in FIGS. 1 and 2, a flow chart of image identification and defect diagnoses of an infrared thermal imaging detection system for a substation insulator includes the following steps.

(1) An infrared module imaging terminal downloads a to-be-detected insulator image from an insulator image storage module.

(2) After the image is successfully downloaded, the infrared module imaging terminal extracts key parameters of the image by using an image preprocessing module, and common key parameters include an infrared resolution, a field angle, a temperature range, a measurement accuracy, and the like.

(3) After the key parameters are extracted, an embedded fault detection terminal displays the foregoing processed data in an initialized thermal region segmentation preview module, and finally displays an entire interface in a given interface.

(4) After the foregoing parameters are imported into an improved Yolov5 model, insulator identification can be performed after a weight file is trained.

(5) A core computing module and a Jetson core module are configured to control a computing accuracy of the infrared module to adjust a temperature computing parameter.

(6) Judge whether the identification is accurate or not.

(7) If the identification is accurate, a defect diagnosis is completed through an intelligent diagnosis algorithm based on multi-feature quantities, including a temperature-based time-space gradient, and a temperature probability density.

(8) Parallel acceleration can enable pixels to be grouped based on different semantic meanings expressed in the insulator image. An intensive prediction and an inference label are applied to each pixel, and each pixel is marked as a class identification object or region of its shell.

(9) When an interaction event is triggered, the infrared module imaging terminal determines whether to send an event task to the embedded fault detection terminal, and when the infrared module imaging terminal is not required for support, an infrared module imaging page refreshes the insulator image again. On the contrary, the infrared module imaging terminal sends the event task and parameter data to the embedded fault detection terminal for processing. After the embedded fault detection terminal performs processing, the embedded fault detection terminal returns a new insulator image to the infrared module imaging terminal, and the infrared module imaging terminal performs step (2) and step (3) again.

What is claimed is:

1. An infrared thermal imaging defect detection apparatus for a substation insulator, comprising an infrared module and a core computing module, wherein the infrared module is bidirectionally connected to the core computing module, and an infrared module is unidirectionally connected to a high-rate battery; the core computing module is unidirectionally connected to a touch screen; and the infrared module is configured to obtain infrared radiation information through a lens, and calculate and generate a temperature distribution video;

wherein an improved You Only Look Once version 5 (Yolov5) algorithm model is used in infrared image identification of the substation insulator, and a computing process is performed by using a graphics processing unit (GPU) of the core computing module; a defect diagnosis is implemented based on an adaptive feature temperature extraction algorithm, and is jointly implemented by using a central processing unit (CPU) and the GPU of the core computing module, and a specific defect diagnosis process is that a compiled linux executable file is run in the core computing module, the file is loaded with a trained improved Yolov5 algorithm weight file, the GPU performs a convolution operation on a photographed video stream or picture, and finally inputs a video stream or picture obtained after the convolution operation into a classifier and preselected boxes Anchor boxes identify the substation insulator, and after the substation insulator is detected, the substation insulator defect is diagnosed based on the adaptive feature temperature extraction algorithm and a defect level judgment criterion; and a touch display screen displays infrared thermal images, identified substation insulators, and defect levels in real time;

wherein before the convolution operation, the GPU converts original red, green, blue (RGB) three channels of the photographed video stream or picture into a grayscale image single channel, wherein the converted grayscale image single channel is inputted the improved Yolov5 algorithm model; and wherein during the convolution operation, an image is sliced through a Focus structure in a backbone section and input to a subsequent Cross Stage Partial (CSP) structure, wherein a Neck part uses an Feature Pyramid Network and Path Aggregation Network (FPN+PAN) structure and uses a Cross Stage Partial version 2 (CSP2) structure designed by a Cross Stage Partial Network (CSPnet) for reference to enhance a capability of feature fusion.

2. The infrared thermal imaging defect detection apparatus for a substation insulator according to claim 1, wherein the core computing module is configured to control operation and computation of the infrared module so as to adjust a temperature computing parameter; and the core computing module is further configured to implement identification of an infrared image of the substation insulator, core computing of key temperature information in an insulator area, and infrared thermal imaging and fault detection for the substation insulator.

3. The infrared thermal imaging defect detection apparatus for a substation insulator according to claim 1, wherein diagnostic development of the core computing module is based on Ubuntu ARM64; infrared image processing and identification tasks are completed in the GPU of the core computing module, a parallel computing architecture adopts CUDA10.2+cuDnn8.0, and based on the computing architecture a Yolov5 convolutional neural network model is optimized; specifically, first, original red, green, blue (RGB) three channels of a photographed and extracted video stream or picture are converted into a grayscale image single channel, and then, K-means clustering is performed on preselected boxes Anchor boxes based on an acquired substation insulator data set; and a data stream analysis tool DeepStream 5.0 is used to accelerate a process of implementing real-time device identification for implementing real-time video data processing.

4. The infrared thermal imaging defect detection apparatus for a substation insulator according to claim 1, wherein the infrared module uses an uncooled focal plane infrared module, an infrared temperature image has a resolution of 640×480 or more, and the infrared module is connected to the core computing module by using Ethernet, and communicates with the core computing module by using a real time streaming protocol (RTSP); the core computing module employs Jetson Xavier NX from Nvidia; and the touch screen is connected to the core computing module by using a High-Definition Multimedia Interface (HDMI) transport protocol interface and a Universal Serial Bus (USB) transport protocol interface, which are configured to transmit an image signal and a control signal, respectively.

5. A detection method carried out using the apparatus according to claim 1, comprising:

S1, infrared video acquisition: starting the apparatus by using a switch button, automatically processing and generating, by an infrared module, an infrared thermal image, and setting, by an operator, an ambient temperature parameter by using a touch display screen, and aligning a lens of the apparatus to a target device;

S2, thermal region segmentation: performing sliding window analysis on the thermal image obtained by an infrared module, and segmenting the thermal image to obtain a square thermal region;

S3, device type determination: inputting an image of the square thermal region into a convolutional neural network model for device identification, returning, by the model, an identified substation insulator, and if no identifiable device type is detected, returning "no device";

S4, key temperature information extraction: calculating a maximum temperature value $T_1$ and coordinates thereof, a median temperature value $T_2$ and an average temperature $T_0$ in the square thermal region, and calculating a temperature difference $\Delta T = T_1 - T_2$, and a relative temperature difference $\delta = (T_1 - T_2)/(T_1 - T_0)$;

S5, defect diagnoses: with reference to the identified device type, the temperature difference $\Delta T$ and the relative temperature difference δ, querying a diagnosis criterion table to determine whether the diagnosis criterion table is in an abnormal interval and a corresponding defect property;

S6, result display: displaying, by a display screen, a photographed infrared thermal image in real time, displaying the identified device type in a form of text, if a diagnosis result is that a defect exists, displaying a defect level in a form of text, and marking a location area in which a hot spot is located in a form of a box; and S7, result saving: saving a picture corresponding to the current frame, and generating JSON file for recording a picture number, a substation insulator, a temperature difference, a relative temperature difference, a hot spot location, and defect type information.

6. The detection method according to claim 5, wherein a process of determining a type of a substation insulator and displaying a result specifically comprises:

(1) considering a maximum temperature as a suspected heating point temperature, considering a median temperature value as a normal temperature value, considering an average temperature as an ambient temperature, calculating a temperature difference and a relative temperature difference, calculating a maximum temperature value $T_1$ and coordinates thereof, a median temperature value $T_2$, and an average temperature $T_0$ in the square thermal region, and calculating a temperature difference $\Delta T = T_1 - T_2$, and a relative temperature difference $\delta = (T_1 - T_2)/(T_1 - T_0)$;

(2) automatically querying whether the temperature difference and the relative temperature difference are in a defect range based on an identified type of power equipment;

(3) if the hot spot conforms to a defect criterion, calculating coordinates of the hot spot in a thermal image before segmentation based on a quantity of sliding times of the thermal region and a step size; and (4) displaying an original thermal image data stream, displaying the identified device type in real time, and marking the hot spot location with a box if a defect exists.

7. The detection method according to claim 5, wherein a process of segmenting to obtain a square thermal region comprises: (1) setting a square window size, wherein a side length value is the same as an infrared video height value; (2) calculating an average temperature under a square window; (3) sliding the window for several times, segmenting an image by selecting a window with a maximum average temperature, and recording a step size and a quantity of slipping times corresponding to the thermal region.

8. The detection method according to claim 5, wherein identification of the substation insulator is based on an improved Yolov5 model of a deep convolutional neural network model Yolov5, an input object is a square thermal region obtained through segmentation, and an output object is the substation insulator and a voltage level of the substation insulator.

9. The detection method according to claim 5, wherein the key temperature information comprises a maximum temperature value and coordinates thereof, a median temperature value, and an average temperature in the square thermal region after segmentation.

* * * * *